United States Patent
Lu et al.

(10) Patent No.: US 12,222,086 B2
(45) Date of Patent: Feb. 11, 2025

(54) EMERGENCY LIGHTING DEVICE HAVING CHARGING MODE SWITCHING FUNCTION

(71) Applicant: Xiamen PVTECH Co., Ltd., Fujian (CN)

(72) Inventors: Fuxing Lu, Fujian (CN); Dasheng Li, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 151 days.

(21) Appl. No.: 18/199,983

(22) Filed: May 22, 2023

(65) Prior Publication Data

US 2024/0240766 A1   Jul. 18, 2024

(30) Foreign Application Priority Data

Jan. 16, 2023   (CN) .......................... 202310067884.1

(51) Int. Cl.
| | |
|---|---|
| *F21S 9/02* | (2006.01) |
| *F21V 23/02* | (2006.01) |
| *F21V 23/04* | (2006.01) |
| *H02J 7/00* | (2006.01) |
| *F21Y 115/10* | (2016.01) |

(52) U.S. Cl.
CPC ............ *F21S 9/022* (2013.01); *F21V 23/023* (2013.01); *F21V 23/04* (2013.01); *H02J 7/0063* (2013.01); *H02J 7/00716* (2020.01); *F21Y 2115/10* (2016.08)

(58) Field of Classification Search
CPC ........ F21S 9/022; F21V 23/023; F21V 23/04; H02J 7/0063; H02J 7/00716
See application file for complete search history.

(56) References Cited

U.S. PATENT DOCUMENTS

| | | | | |
|---|---|---|---|---|
| 5,365,145 A | * | 11/1994 | Fields ...................... | H02J 9/02 |
| | | | | 315/86 |
| 8,033,686 B2 | * | 10/2011 | Recker ................... | H05B 45/10 |
| | | | | 362/249.02 |
| 8,362,713 B2 | * | 1/2013 | Recker .................... | H02J 9/065 |
| | | | | 315/293 |
| 11,316,364 B2 | * | 4/2022 | Zhou ........................ | H02J 9/02 |
| 2002/0199131 A1 | * | 12/2002 | Kocin ....................... | H02J 7/34 |
| | | | | 714/14 |
| 2003/0141819 A1 | * | 7/2003 | Cojocary ................ | H02J 9/065 |
| | | | | 315/86 |

(Continued)

*Primary Examiner* — Ismael Negron
(74) *Attorney, Agent, or Firm* — Winston Hsu

(57) ABSTRACT

An emergency lighting device having charging mode switching function includes a rechargeable battery module, a light source, a driving module, a charging mode switching module and a control module. The driving module is connected to the light source and the rechargeable battery module, and connected to an external power source via an external switch. The charging mode switching module has a main input end, a first input end, a second input end and an output end. The main input end is connected to the driving module to receive the driving signal of the driving module, and the output end is connected to the rechargeable battery module. The control module is connected to the driving module, and has a first output end and a second output end. The first output end is connected to the first input end and the second output end is connected to the second input end.

10 Claims, 7 Drawing Sheets

(56) References Cited

U.S. PATENT DOCUMENTS

| | | | | |
|---|---|---|---|---|
| 2015/0188347 | A1* | 7/2015 | Ruan | H02J 7/0031 |
| | | | | 320/135 |
| 2017/0307155 | A1* | 10/2017 | Brandes | F21S 9/022 |
| 2023/0369873 | A1* | 11/2023 | Zhong | H02J 7/02 |
| 2024/0146100 | A1* | 5/2024 | Guo | H02J 7/0063 |

* cited by examiner

EMERGENCY LIGHTING DEVICE HAVING CHARGING MODE SWITCHING FUNCTION

BACKGROUND OF THE INVENTION

1. Field of the Invention

The present invention relates to a lighting device, in particular to an emergency lighting device having charging mode switching function.

2. Description of the Prior Art

A currently available lighting device having emergency lighting function usually includes a constant current driving module, a rechargeable battery module, a boosting module and a control module, etc. When the light source of the lighting device is turned on, the rechargeable battery module of the lighting device usually enters the charging mode. In the meanwhile, the overall temperature of the lighting device may quickly rise because the light source is in on state and the rechargeable battery module is the charging mode, which may cause damage to the rechargeable battery module. In addition, the service life of the rechargeable battery module may be reduced due to high temperature.

Moreover, since the rechargeable battery module in the charging mode consumes 20-30% of the overall power of the lighting device, which may decrease the light efficiency of the lighting device (by about 30%). Therefore, when the rechargeable battery module of the lighting device is not in the fully-charged state, the light efficiency of the lighting device may not meet the industrial standards.

SUMMARY OF THE INVENTION

One embodiment of the present invention provides an emergency lighting device having charging mode switching function, which includes a rechargeable battery module, a light source, a driving module, a charging mode switching module and a control module. The driving module is connected to the light source and the rechargeable battery module, and connected to an external power source via an external switch. The charging mode switching module has a main input end, a first input end, a second input end and an output end. The main input end is connected to the driving module to receive the driving signal of the driving module, and the output end is connected to the rechargeable battery module. The control module is connected to the driving module, and has a first output end and a second output end. The first output end is connected to the first input end and the second output end is connected to the second input end. When the control module detects that the external switch is in on state, the first output end outputs a first charging signal to the first input end, such that the control module executes a first charging mode in order to charge the rechargeable battery module.

In one embodiment, when the control module detects that the external switch is in off state, the first output end outputs the first charging signal to the first input end and the second output end outputs a second charging signal to the second input end, such that the control module performs a second charging module to charge the rechargeable battery module.

In one embodiment, the first charging mode is a slow-charging mode and the second charging mode is a fast-charging mode.

In one embodiment, the charging module switching module includes a first charging circuit. The first charging circuit includes a first resistor, a second resistor, a third resistor, a first switch and a second switch. The first end of the first switch is connected to the first input end via the first resistor and the second end of the first switch is grounded. One end of the second resistor is connected to the third end of the first switch, the other end of the second resistor is connected to a first node, and the first node is connected to the driving module. The first end of the second switch is connected to the third end of the first switch, the second end of the second switch is connected to the first node and the third end of the second switch is connected to a second node. One end of the third resistor is connected to the second node, the other end of the third resistor is connected to the third node and the third node is connected to the rechargeable battery module.

In one embodiment, the charging mode switching module includes a second charging circuit. The second charging circuit includes a fourth resistor, a fifth resistor, a sixth resistor, a third switch and a fourth switch. The first end of the third switch is connected to the second input end via the fourth resistor, the second end of the third switch is grounded and one end of the fifth resistor is connected to the third end of the third switch. The other end of the fifth resistor is connected to the second node, the first end of the fourth switch is connected to the third end of the third switch, the second end of the fourth switch is connected to the second node and the third end of the fourth switch is connected to one end of the sixth resistor. The other end of the sixth resistor is connected to the third node.

In one embodiment, the charging mode switching module further includes a seventh resistor. One end of the seventh resistor is connected to the third node and another end of the seventh resistor is grounded.

In one embodiment, the first switch and the third switch are bipolar junction transistors.

In one embodiment, the second switch and the fourth switch are metal-oxide-semiconductor field-effect transistors.

In one embodiment, the light source is a light-emitting diode or a light-emitting diode array.

In one embodiment, the external switch is a wall switch and the external power source is a utility power.

The emergency lighting device having charging mode switching function in accordance with the embodiments of the present invention may have the following advantages:

(1) In one embodiment of the present invention, the emergency lighting device has a charging mode switching module, which has a first charging circuit and a second charging circuit. Therefore, the charging mode switching module can be switched between a first charging mode and a second charging mode. When the emergency lighting device in a normal lighting mode, the charging mode switching module performs the first charging mode (slow-charging mode) in order to charge the rechargeable battery module. The above mechanism can avoid that the rechargeable battery module is damaged due to high temperature, which can effectively extend the service life of the rechargeable battery module.

(2) In one embodiment of the present invention, the emergency lighting device has the charging mode switching module and the charging mode switching module can be switched between the first charging mode and the second charging mode. When the emergency lighting device is in off state, the charging mode switching module can execute the second charging mode (fast-charging mode) in order to charge the rechargeable battery module. The above mechanism can make the rechargeable battery module swiftly achieve the fully-charged state so as to avoid that the light efficiency of the lighting device decreases. Thus, the emergency lighting device can satisfy the industrial standards, so the lighting device can be more comprehensive in application.

(3) In one embodiment of the present invention, the emergency lighting device has the charging mode switching module, which can perform the second charging mode when the emergency lighting device is in off state so as to charge the rechargeable battery module. The above mechanism can make the rechargeable battery module remain the fully-charged state for a long period of time. Thus, the emergency lighting device can provide the emergency lighting function for a long time during power outage, so the emergency lighting device can conform to actual requirements.

(4) In one embodiment of the present invention, the emergency lighting device has the charging mode switching module, which can effectively avoid that the rechargeable battery module is damaged duo to high temperature so as to extend the service life of the rechargeable battery module. Accordingly, the service life of the emergency lighting device can be greatly increased with a view to reducing the maintenance cost of the lighting system, which can reduce the amount of waste and meet the requirements of environmental protection.

(5) In one embodiment of the present invention, the design of the emergency lighting device is simple, so the emergency lighting device can achieve the desired technical effects without significantly increasing the cost thereof. Therefore, the emergency lighting device can have high commercial value.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
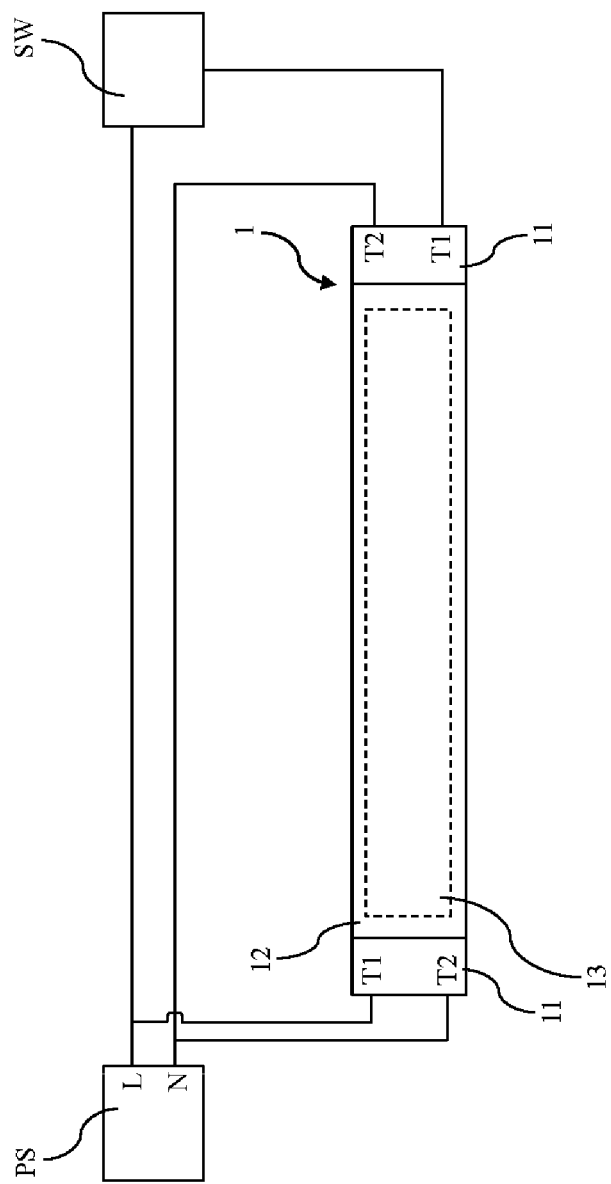
FIG. 1 is a schematic view of an emergency lighting device having charging mode switching function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a schematic view of an emergency lighting device having charging mode switching function in accordance with one embodiment of the present invention. As shown in FIG. 1, the emergency lighting device 1 includes two end caps 11, a light cover 12 and a light source 13. The light source 13 is disposed inside the light cover 12. In the embodiment, the light source 13 may include a plurality of light-emitting diodes (LEDs) and a circuit board. The LEDs are disposed on the circuit board. In another embodiment, the light source 13 may include a plurality of LED arrays and a circuit board. The LED arrays are disposed on the circuit board. In still another embodiment, the light source 13 may be a fluorescent light.

The two end caps 11 are disposed at the two ends of the light cover 12. The live wire terminal T1 and the neutral wire terminal T2 of one of the end caps 11 are connected to the live wire output end L and the neutral wire output end N of an external power source PS respectively. The live wire terminal T1 of the other of the end caps 11 is connected to the live wire output end L of the external power source PS via an external switch SW, and the neutral wire terminal T2 thereof is connected to the neutral wire output end N of the external power source PS. In one embodiment, the external switch SW may be a wall switch or other similar switches. In one embodiment, the external power source PS is the utility power, a generator or other similar devices.

The embodiment just exemplifies the present invention and is not intended to limit the scope of the present invention; any equivalent modification and variation according to the spirit of the present invention is to be also included within the scope of the following claims and their equivalents.

Figure 2:
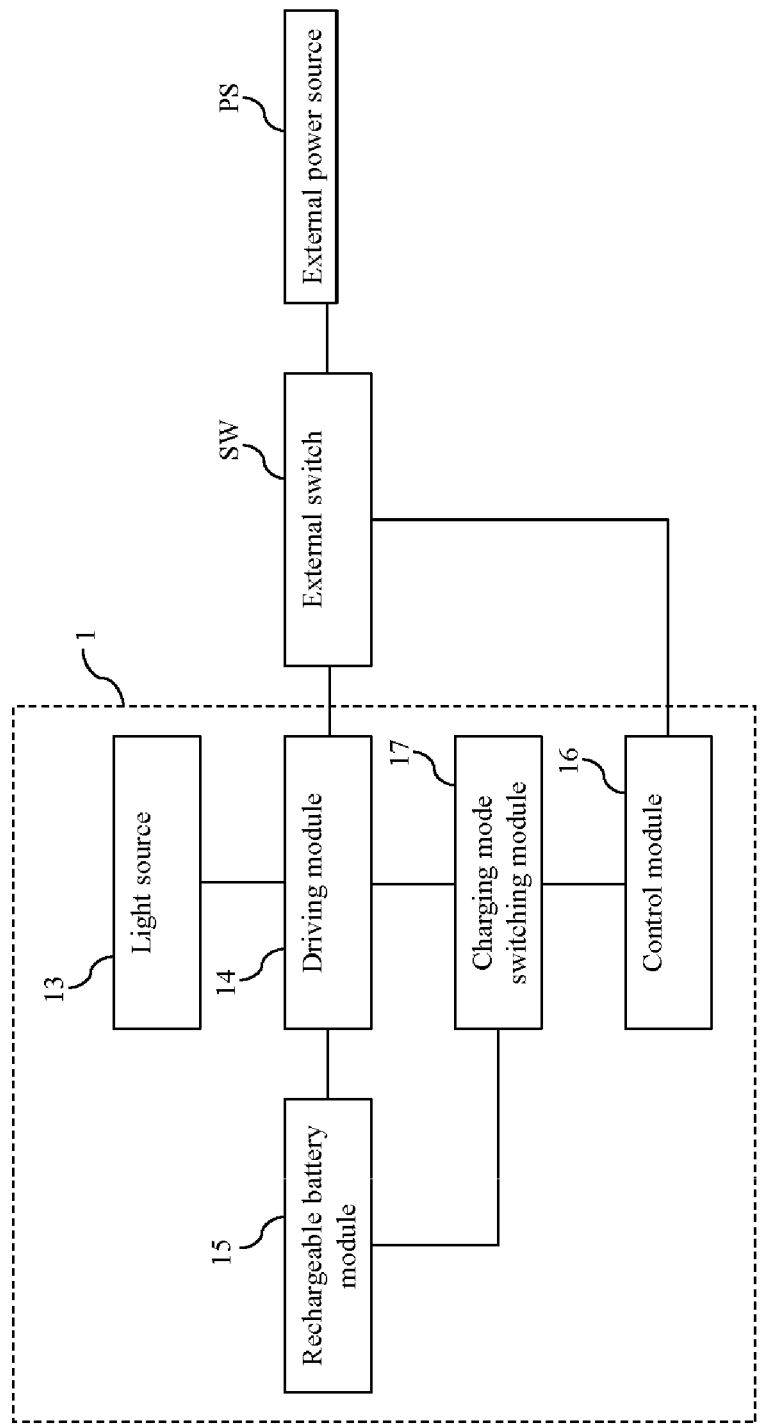
FIG. 2 is a block diagram of the emergency lighting device having charging mode switching function in accordance with one embodiment of the present invention.
Figure 3:
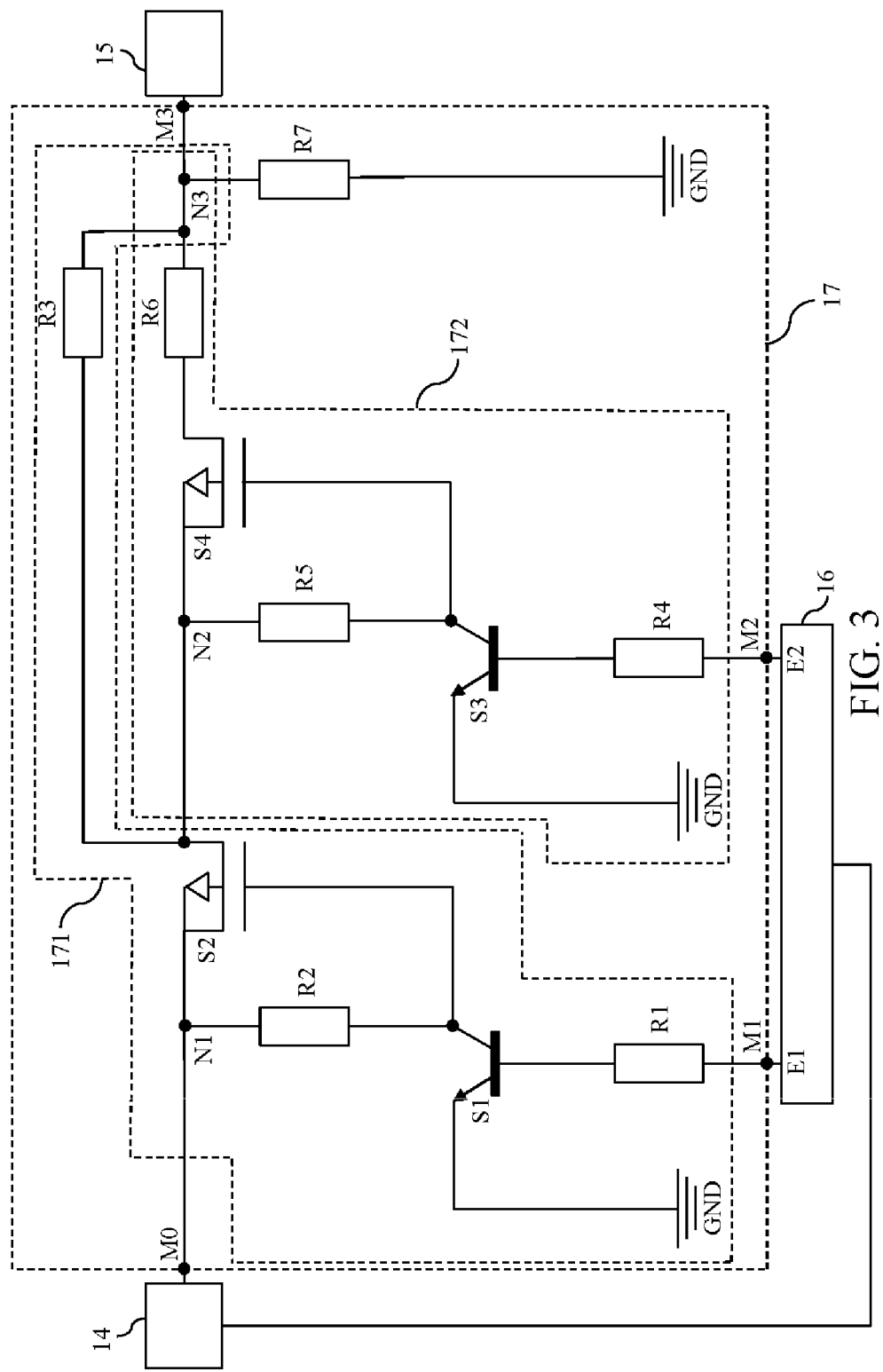
FIG. 3 is a circuit diagram of an emergency lighting device having charging mode switching function in accordance with one embodiment of the present invention.

Please refer to FIG. 2 and FIG. 3. FIG. 2 is a block diagram of the emergency lighting device having charging mode switching function in accordance with one embodiment of the present invention. FIG. 3 is a circuit diagram of an emergency lighting device having charging mode switching function in accordance with one embodiment of the present invention. As shown in FIG. 2 and FIG. 3, the emergency lighting device 1 further includes a driving module 14, a rechargeable battery module 15, a control module 16 and a charging mode switching module 17. The above modules can be disposed in any one of the end caps 11.

The driving module 14 is connected to the light source 13 and the rechargeable battery module 15, and is connected to the external power source PS via the external switch SW. In one embodiment, the driving module 14 may be a LED driver or the drivers for other currently available light sources. In one embodiment, the rechargeable battery module 15 may be a Li battery, NiMH battery, NiCd battery or other similar components.

The charging mode switching module 17 has a main input end M0, a first input end M1, a second input end M2 and an output end M3. The main input end M0 of the charging mode switching module 17 is connected to the driving module 14 to receive the driving signal of the driving module 14. The output end of the charging mode switching module 17 is connected to the rechargeable battery module 15. The output end M3 of the charging mode switching module 17 is connected to the rechargeable battery module 15. Thus, the driving module 14 is connected to the rechargeable battery module 15 via the charging mode switching module 17.

The control module 16 is connected to the driving module 14, and has a first output end E1 and a second output end E2. The first output end E1 of the control module 16 is connected to the first input end M1 of the charging mode switching module 17, and the second output end of the control module 16 is connected to the second input end M2 of the charging mode switching module 17. In one embodiment, the control module 16 may be a microcontroller unit (MCU), a central-processing unit (CPU), a field programmable gate array (FPGA) or other similar components.

The charging module switching module 17 includes a first charging circuit 171 and a second charging circuit 172. The first charging circuit 171 includes a first resistor R1, a second resistor R2, a third resistor R3, a first switch S1 and a second switch S2. In the embodiment, the first switch S1 may be a bipolar junction transistor (BJT). In another embodiment, the first switch S1 may be a metal oxide semiconductor field effect transistor (MOSFET) or other similar components. The first end (base) of the first switch S1 is connected to the first input end M1 of the charging module switching module 17 via the first resistor R1. The second end (emitter) of the first switch S1 is connected to a grounding point (GND). One end of the second resistor R2 is connected to the third end (collector) of the first switch Q1. The other end of the second resistor R2 is connected to a first node N1, and the first node N0 is connected to the driving module 14. In the embodiment, the second switch S2 may be a BJT. In another embodiment, the second switch S1 may be a MOSFET or other similar components. The first end (gate) of the second switch S2 is connected to the third end (collector) of the first switch S1; the second end (source) of the second switch S2 is connected to the first node N1; the third end (drain) of the second switch S2 is connected to a second node N2. One end of the third resistor R3 is connected to the second node N2, and the other end of the third resistor R3 is connected to a third node N3. The third node N3 is connected to the rechargeable battery module 15.

The second charging circuit 172 includes a fourth resistor R4, a fifth resistor R5, a sixth resistor R6, a third switch S3 and a fourth switch S4. In the embodiment, the third switch S3 may be a BJT. In another embodiment, the third switch S3 may be a MOSFET or other similar components. The first end (base) of the third switch S3 is connected to the second input end M2 of the charging module switching module 17 via the fourth resistor R4; the second end (emitter) of the third switch S3 is connected to the grounding point GND; one end of the fifth resistor R5 is connected to the third end (collector) of the third switch S3. The other end of the fifth resistor R5 is connected to the second node N2. In the embodiment, the fourth switch S4 may be a BJT. In another embodiment, the fourth switch S4 may be a MOSFET or other similar components. The first end (gate) of the fourth switch S4 is connected to the third end (collector) of the third switch S3; the second end (source) of the fourth switch S4 is connected to the second node N2; the third end (drain) of the fourth switch S4 is connected to one end of the sixth resistor R6. The other end of the sixth resistor R6 is connected to the third node N3.

In addition, the charging module switching module 17 further includes a seventh resistor R7. One end of the seventh resistor R7 is connected to the third node N3 and the other end of the seventh resistor R7 is connected to the grounding point GND.

The embodiment just exemplifies the present invention and is not intended to limit the scope of the present invention; any equivalent modification and variation according to the spirit of the present invention is to be also included within the scope of the following claims and their equivalents.

Figure 4:
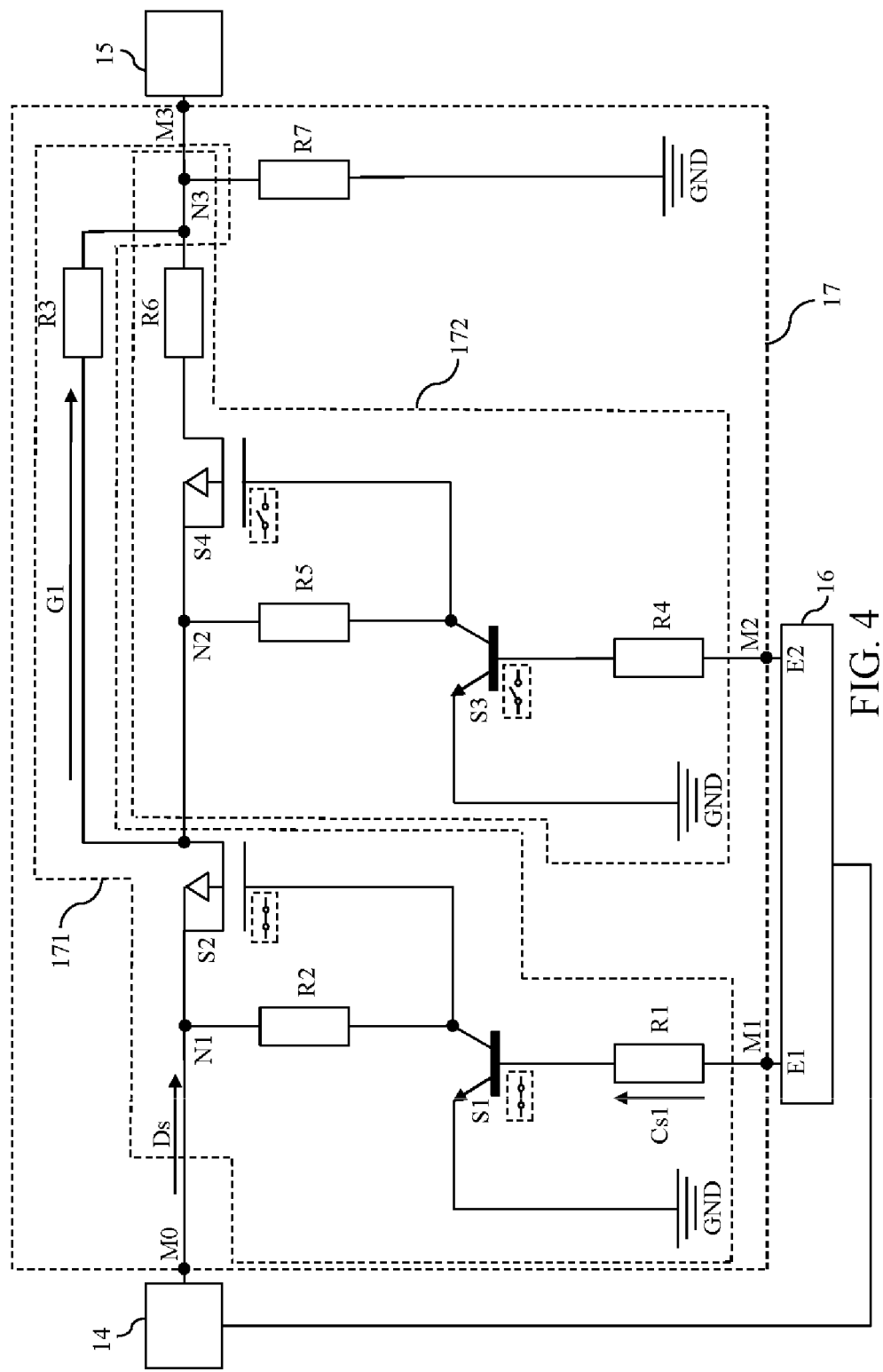
FIG. 4 is a first schematic view of one of the operational states of the emergency lighting device having charging mode switching function in accordance with one embodiment of the present invention.

Please refer to FIG. 4, which is a first schematic view of one of the operational states of the emergency lighting device having charging mode switching function in accordance with one embodiment of the present invention. As shown in FIG. 4, the driving module 14 outputs a driving signal Ds to the main input end M0 of the charging module switching module 17. The control module 17 is connected to the external switch SW so as to detect whether the external switch SW is in on state or off state. When the control module 16 detects that the external switch SW is in on state, the first output end E1 of the control module 16 outputs a first charging signal Cs1 to the first input end M1 of the charging module switching module 17. In this case, the first switch S1 is in on state and the second switch S2 is also in on state, such that the second switch S2 and the third resistor R3 form a path is to generate a first charging current G1. In this way, the control module 16 can execute a first charging mode (slow-charging mode) in order to charge the rechargeable battery module 15 by the first charging current G1.

The embodiment just exemplifies the present invention and is not intended to limit the scope of the present invention; any equivalent modification and variation according to the spirit of the present invention is to be also included within the scope of the following claims and their equivalents.

Figure 5:
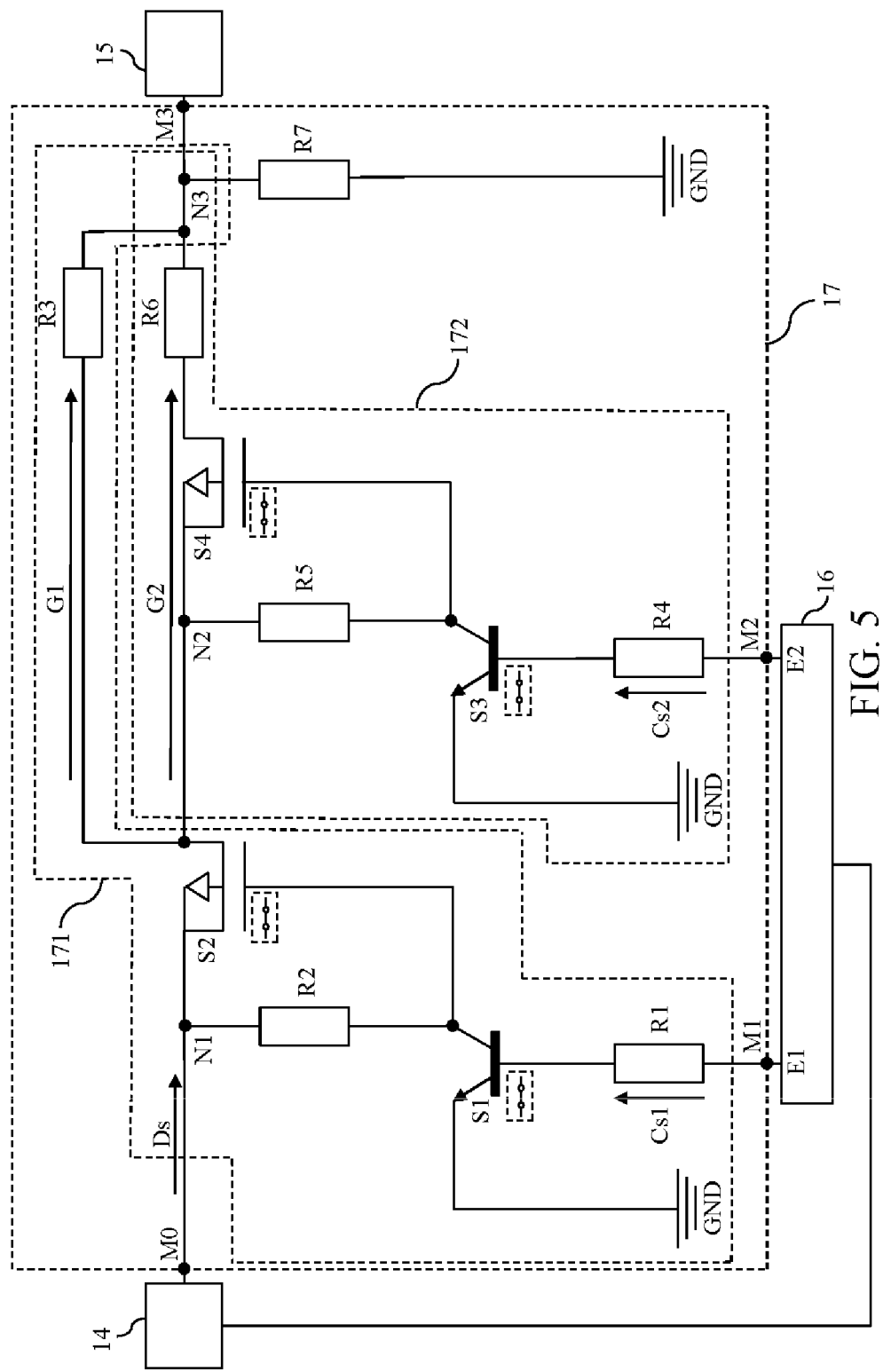
FIG. 5 is a second schematic view of one of the operational states of the emergency lighting device having charging mode switching function in accordance with one embodiment of the present invention.

Please refer to FIG. 5, which is a second schematic view of one of the operational states of the emergency lighting device having charging mode switching function in accordance with one embodiment of the present invention. As shown in FIG. 5, when the control module 16 detects that the external switch SW is in off state, the first output end E1 of the control module 16 outputs the first charging signal Cs1 to the first input end M1 of the charging module switching module 17 and the second output end E2 of the control module 16 outputs a second charging signal Cs2 to the second input end M2 of the charging module switching module 17. In this case, the first switch S1 is in on state and the second switch S2 is also in on state, such that the second switch S2 and the third resistor R3 form the path is to generate the first charging current G. Further, the third switch S3 is in on state and the fourth switch S4 is also in on state, such that the fourth switch S4 and the sixth resistor R6 form a path to generate a second charging current G2. In this way, the control module 16 can execute a second charging mode (fast-charging mode) in order to charge the rechargeable battery module 15 by the first charging current G1 and the second charging current G2.

As previously stated, the emergency lighting device 1 has the charging mode switching module 17. The charging mode switching module 17 has the first charging circuit 171 and the second charging circuit 172, such that the charging mode switching module 17 can be switched between the first charging mode and the second charging mode. When the external switch SW (wall switch) is in on state, the external power source PS can power the driving module 14, so the driving module 14 can drive the light source 13. In the meanwhile, the emergency lighting device 1 is in the normal lighting mode, the light generated by the light source 13 cause the temperature of the internal space of the emergency lighting device 1 to increase. Therefore, the charging mode switching module 17 can enter the first charging mode (slow-charging mode) to charge the rechargeable battery module 15 by low current (only the first charging current G1). In this way, the temperature of the rechargeable battery module 15 will not swiftly increase, which can effectively extend the service life of the rechargeable battery module 15.

On the contrary, when the external switch SW (wall switch) is in off state, the external power source PS cannot power the driving module 14, so the driving module 14 cannot power the light source 13. In this case, the light source 13 is in off state and the temperature of the internal space of the emergency lighting device 1 decreases. Thus, the charging mode switching module 17 can enter the second charging mode (fast-charging mode) to charge the rechargeable battery module 15 by high current (the first charging current G1+the second charging current G2). The above mechanism can make the rechargeable battery module 15 achieve the fully-charged state in a short time in order to avoid that the light efficiency of the emergency lighting device 1 is reduced. Therefore, the emergency lighting device 1 can conform to the industrial standards. On the other hand, the above mechanism can make the rechargeable battery module 15 remain the fully-charged state for a long period of time. Accordingly, the service life of the emergency lighting device 1 can be greatly increased with a view to reduce the maintenance cost of the lighting system, which can reduce the amount of waste and meet the requirements of environmental protection.

The circuit design of the charging mode switching module 17 is simple and the charging mode switching module 17 can achieve the desired technical effects via the high-efficiency operational mechanism. As a result, the emergency lighting device 1 can achieve the desired technical effects without significantly increasing the cost thereof, so the emergency lighting device 1 can have high commercial value.

The embodiment just exemplifies the present invention and is not intended to limit the scope of the present invention; any equivalent modification and variation according to the spirit of the present invention is to be also included within the scope of the following claims and their equivalents.

It is worthy to point out that when the light source of the lighting device is turned on, the rechargeable battery module of the lighting device usually enters the charging mode. In the meanwhile, the overall temperature of the lighting device may quickly rise because the light source is in on state and the rechargeable battery module is the charging mode, which may cause damage to the rechargeable battery module. In addition, the service life of the rechargeable battery module may be reduced due to high temperature. Besides, since the rechargeable battery module in the charging mode consumes 20-30% of the overall power of the lighting device, which may decrease the light efficiency of the lighting device (by about 30%). Therefore, when the rechargeable battery module of the lighting device is not in the fully-charged state, the light efficiency of the lighting device may not meet the industrial standards. On the contrary, according to one embodiment of the present invention, the emergency lighting device has a charging mode switching module, which has a first charging circuit and a second charging circuit. Therefore, the charging mode switching module can be switched between a first charging mode and a second charging mode. When the emergency lighting device in a normal lighting mode, the charging mode switching module performs the first charging mode (slow-charging mode) in order to charge the rechargeable battery module. The above mechanism can avoid that the rechargeable battery module is damaged due to high temperature, which can effectively extend the service life of the rechargeable battery module.

Also, according to one embodiment of the present invention, the emergency lighting device has the charging mode switching module and the charging mode switching module can be switched between the first charging mode and the second charging mode. When the emergency lighting device is in off state, the charging mode switching module can execute the second charging mode (fast-charging mode) in order to charge the rechargeable battery module. The above mechanism can make the rechargeable battery module swiftly achieve the fully-charged state so as to avoid that the light efficiency of the lighting device decreases. Thus, the emergency lighting device can satisfy the industrial standards, so the lighting device can be more comprehensive in application.

Further, according to one embodiment of the present invention, the emergency lighting device has the charging mode switching module, which can perform the second charging mode when the emergency lighting device is in off state so as to charge the rechargeable battery module. The above mechanism can make the rechargeable battery module remain the fully-charged state for a long period of time. Thus, the emergency lighting device can provide the emergency lighting function for a long time during power outage, so the emergency lighting device can conform to actual requirements.

Moreover, according to one embodiment of the present invention, the emergency lighting device has the charging mode switching module, which can effectively avoid that the rechargeable battery module is damaged duo to high temperature so as to extend the service life of the rechargeable battery module. Accordingly, the service life of the emergency lighting device can be greatly increased with a view to reducing the maintenance cost of the lighting system, which can reduce the amount of waste and meet the requirements of environmental protection.

Furthermore, according to one embodiment of the present invention, the design of the emergency lighting device is simple, so the emergency lighting device can achieve the desired technical effects without significantly increasing the cost thereof. Therefore, the emergency lighting device can have high commercial value. As set for the above, the emergency lighting device having charging mode switching function according to the embodiments of the present invention can definitely achieve great technical effects.

Figure 6:
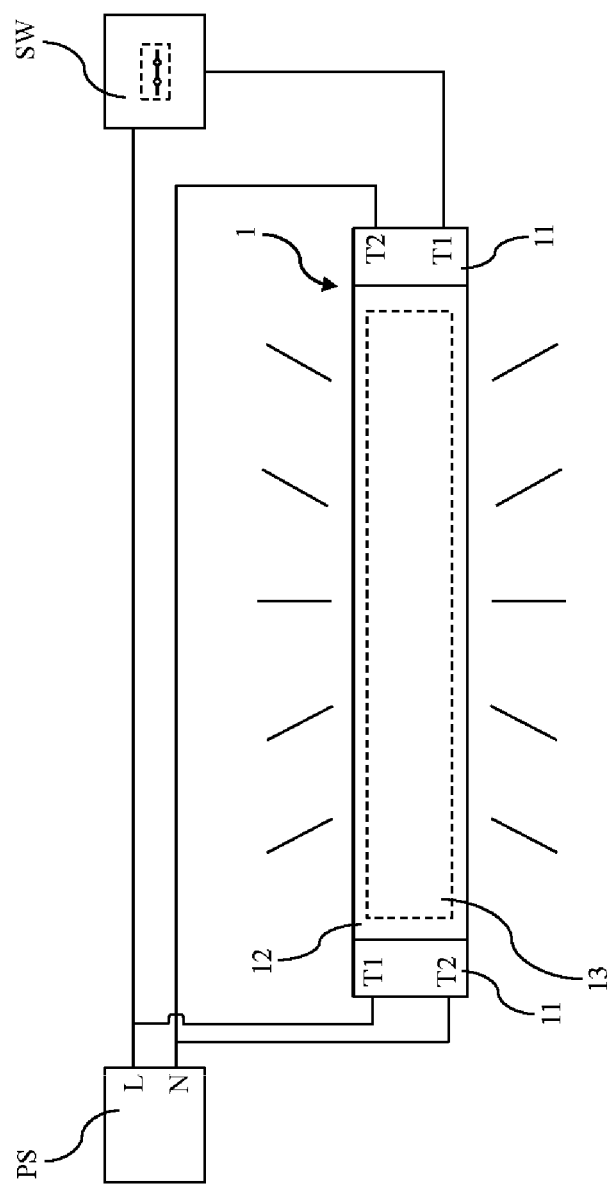
FIG. 6 is a third schematic view of one of the operational states of the emergency lighting device having charging mode switching function in accordance with one embodiment of the present invention.

Please refer to FIG. 6, which is a third schematic view of one of the operational states of the emergency lighting device having charging mode switching function in accordance with one embodiment of the present invention. As shown in FIG. 6, when the emergency lighting device 1 is in the normal lighting mode (the external switch SW is in on state), the light source 13 is in on state. Meanwhile, the charging mode switching module 17 enters the first charging mode (slow-charging mode) to charge the rechargeable battery module 15 (the operational state of the circuit of the emergency lighting device 1 is as shown in FIG. 4).

The embodiment just exemplifies the present invention and is not intended to limit the scope of the present invention; any equivalent modification and variation according to the spirit of the present invention is to be also included within the scope of the following claims and their equivalents.

Figure 7:
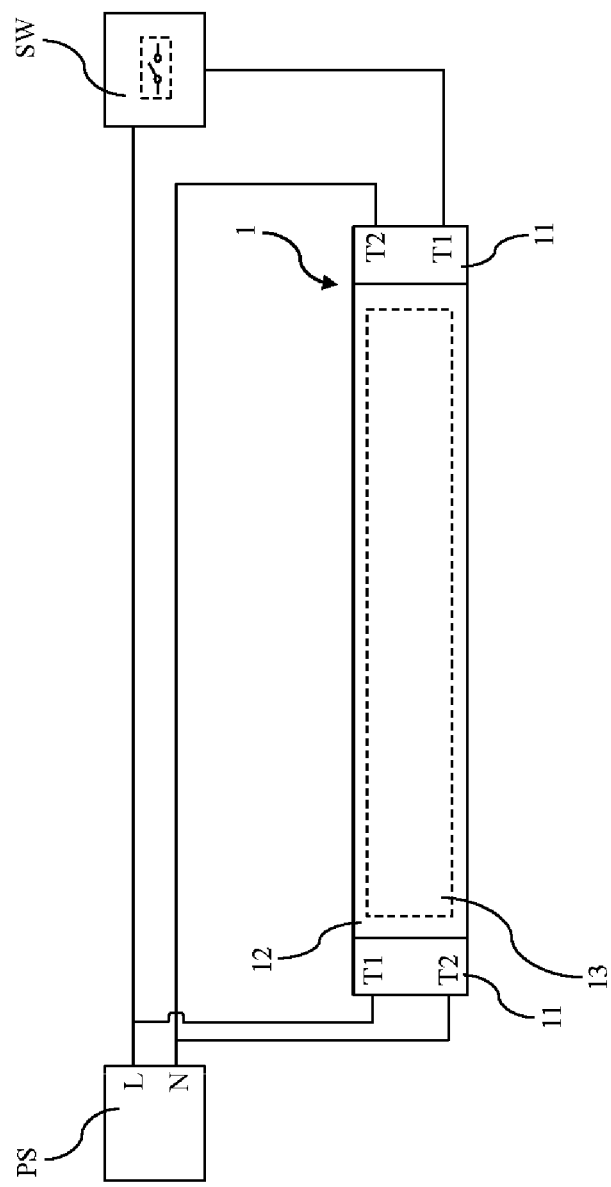
FIG. 7 is a fourth schematic view of one of the operational states of the emergency lighting device having charging mode switching function in accordance with one embodiment of the present invention.

Please refer to FIG. 7, which is a fourth schematic view of one of the operational states of the emergency lighting device having charging mode switching function in accordance with one embodiment of the present invention. As shown in FIG. 7, when the emergency lighting device 1 is in off state (the external switch SW is in off state), the light source 13 is also in off state. Meanwhile, the charging mode switching module 17 enters the second charging mode (fast-charging mode) to charge the rechargeable battery module 15 (the operational state of the circuit of the emergency lighting device 1 is as shown in FIG. 5).

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the emergency lighting device has a charging mode switching module, which has a first charging circuit and a second charging circuit. Therefore, the charging mode switching module can be switched between a first charging mode and a second charging mode. When the emergency lighting device in a normal lighting mode, the charging mode switching module performs the first charging mode (slow-charging mode) in order to charge the rechargeable battery module. The above mechanism can avoid that the rechargeable battery module is damaged due to high temperature, which can effectively extend the service life of the rechargeable battery module.

Also, according to one embodiment of the present invention, the emergency lighting device has the charging mode switching module and the charging mode switching module can be switched between the first charging mode and the second charging mode. When the emergency lighting device is in off state, the charging mode switching module can execute the second charging mode (fast-charging mode) in order to charge the rechargeable battery module. The above mechanism can make the rechargeable battery module swiftly achieve the fully-charged state so as to avoid that the light efficiency of the lighting device decreases. Thus, the emergency lighting device can satisfy the industrial standards, so the lighting device can be more comprehensive in application.

Further, according to one embodiment of the present invention, the emergency lighting device has the charging mode switching module, which can perform the second charging mode when the emergency lighting device is in off state so as to charge the rechargeable battery module. The above mechanism can make the rechargeable battery module remain the fully-charged state for a long period of time. Thus, the emergency lighting device can provide the emergency lighting function for a long time during power outage, so the emergency lighting device can conform to actual requirements.

Moreover, according to one embodiment of the present invention, the emergency lighting device has the charging mode switching module, which can effectively avoid that the rechargeable battery module is damaged duo to high temperature so as to extend the service life of the rechargeable battery module. Accordingly, the service life of the emergency lighting device can be greatly increased with a view to reducing the maintenance cost of the lighting system, which can reduce the amount of waste and meet the requirements of environmental protection.

Furthermore, according to one embodiment of the present invention, the design of the emergency lighting device is simple, so the emergency lighting device can achieve the desired technical effects without significantly increasing the cost thereof. Therefore, the emergency lighting device can have high commercial value.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An emergency lighting device having charging mode switching function, comprising:
   a rechargeable battery module;
   a light source;
   a driving module connected to the light source and the rechargeable battery module, and connected to an external power source via an external switch;
   a charging mode switching module having a main input end, a first input end, a second input end and an output end, wherein the main input end is connected to the driving module to receive a driving signal of the driving module, and the output end is connected to the rechargeable battery module; and
   a control module connected to the driving module, and having a first output end and a second output end, wherein the first output end is connected to the first input end and the second output end is connected to the second input end;
   wherein when the control module detects that the external switch is in an on state, the first output end is configured to output a first charging signal to the first input end, whereby the control module executes a first charging mode in order to charge the rechargeable battery module.

2. The emergency lighting device having charging mode switching function as claimed in claim 1, wherein the light source is a light-emitting diode or a light-emitting diode array.

3. The emergency lighting device having charging mode switching function as claimed in claim 1, wherein the external switch is a wall switch and the external power source is a utility power.

4. The emergency lighting device having charging mode switching function as claimed in claim 1, wherein when the control module detects that the external switch is in an off state, the first output end is configured to output the first charging signal to the first input end and the second output end is configured to output a second charging signal to the second input end, whereby the control module performs a second charging module to charge the rechargeable battery module.

5. The emergency lighting device having charging mode switching function as claimed in claim 4, wherein the first charging mode is a slow-charging mode and the second charging mode is a fast-charging mode.

6. The emergency lighting device having charging mode switching function as claimed in claim 4, wherein the charging module switching module comprises a first charging circuit, and the first charging circuit comprises a first resistor, a second resistor, a third resistor, a first switch and a second switch, wherein a first end of the first switch is connected to the first input end via the first resistor and a second end of the first switch is grounded, wherein one end of the second resistor is connected to a third end of the first switch, another end of the second resistor is connected to a first node, and the first node is connected to the driving module, wherein a first end of the second switch is connected to a third end of the first switch, a second end of the second switch is connected to the first node and a third end of the second switch is connected to a second node, wherein one end of the third resistor is connected to the second node, another end of the third resistor is connected to a third node and the third node is connected to the rechargeable battery module.

7. The emergency lighting device having charging mode switching function as claimed in claim 6, wherein the charging mode switching module comprises a second charging circuit, and the second charging circuit comprises a fourth resistor, a fifth resistor, a sixth resistor, a third switch and a fourth switch, wherein a first end of the third switch is connected to the second input end via the fourth resistor, a second end of the third switch is grounded and one end of the fifth resistor is connected to a third end of the third switch, wherein another end of the fifth resistor is connected to the second node, a first end of the fourth switch is connected to a third end of the third switch, a second end of the fourth switch is connected to the second node and a third end of the fourth switch is connected to one end of the sixth resistor, wherein another end of the sixth resistor is connected to the third node.

8. The emergency lighting device having charging mode switching function as claimed in claim 7, wherein the charging mode switching module further comprises a seventh resistor, wherein one end of the seventh resistor is connected to the third node and another end of the seventh resistor is grounded.

9. The emergency lighting device having charging mode switching function as claimed in claim 7, wherein the first switch and the third switch are bipolar junction transistors.

10. The emergency lighting device having charging mode switching function as claimed in claim 9, wherein the second switch and the fourth switch are metal-oxide-semiconductor field-effect transistors.

* * * * *